United States Patent

Danno et al.

[11] Patent Number: 5,822,088
[45] Date of Patent: Oct. 13, 1998

[54] HOLOGRAM DISPLAY ITEM

[76] Inventors: Steven Danno, 2394 Via Mariposa West #1-D, Laguna Hills, Calif. 92653; Jack Worthington, 2465 Quail Run, Sandy, Utah 84093

[21] Appl. No.: 533,058

[22] Filed: Sep. 25, 1995

[51] Int. Cl.$^6$ .................. G03H 1/00; F21S 1/12
[52] U.S. Cl. .................. 359/1; 359/32; 362/806; 362/812; 362/429
[58] Field of Search .................. 359/1, 19, 32; 362/61, 161, 184, 806, 807, 808, 809, 810, 811, 812, 429

[56] References Cited

U.S. PATENT DOCUMENTS

| | | | |
|---|---|---|---|
| 4,940,301 | 7/1990 | Sallai et al. | 359/1 |
| 4,947,299 | 8/1990 | Liu | 359/1 |
| 5,455,747 | 10/1995 | Aoyama | 359/19 |
| 5,571,277 | 11/1996 | Allred et al. | 362/61 |

*Primary Examiner*—Paul M. Dzerzynski
*Assistant Examiner*—Audrey Chang

[57] ABSTRACT

A hologram display item comprising a hologram member having a front surface with a holographic image thereon and a rear surface. A light source assembly is also provided and is structurally connected to, and fixed relative to, the hologram, at a position to impinge light energy onto the holographic image. In this arrangement, the light source is fixed relative to the holographic image so as to provide, at all times, optimum viewing of the hologram by the observer independent of the position of the hologram display item relative to the position of the observer. The light source, fixed to the hologram display item, emits light energy substantially from a point within the light source at a predetermined angle advantageous for replay or viewing, the angle usually being similar to the known or discoverable angle of original hologram construction.

5 Claims, 4 Drawing Sheets

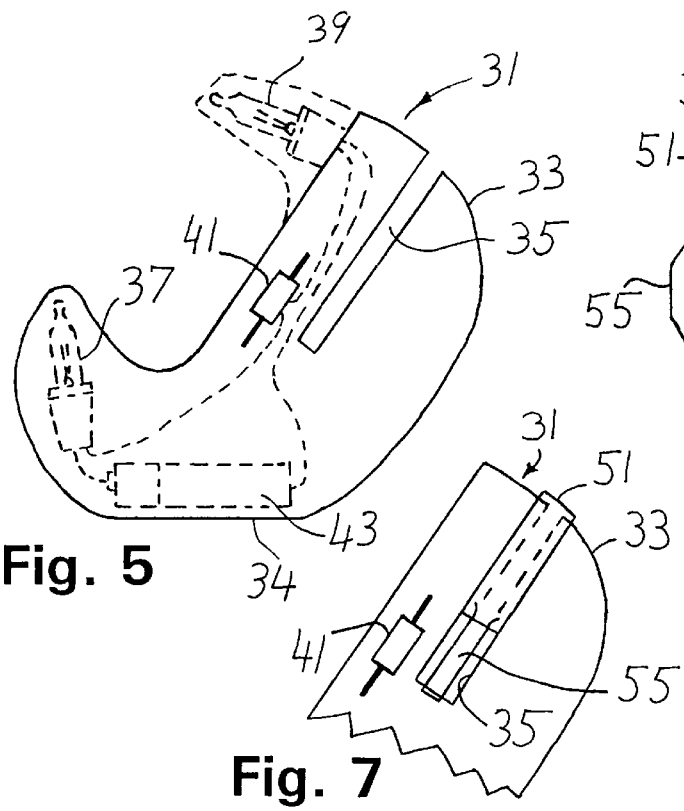
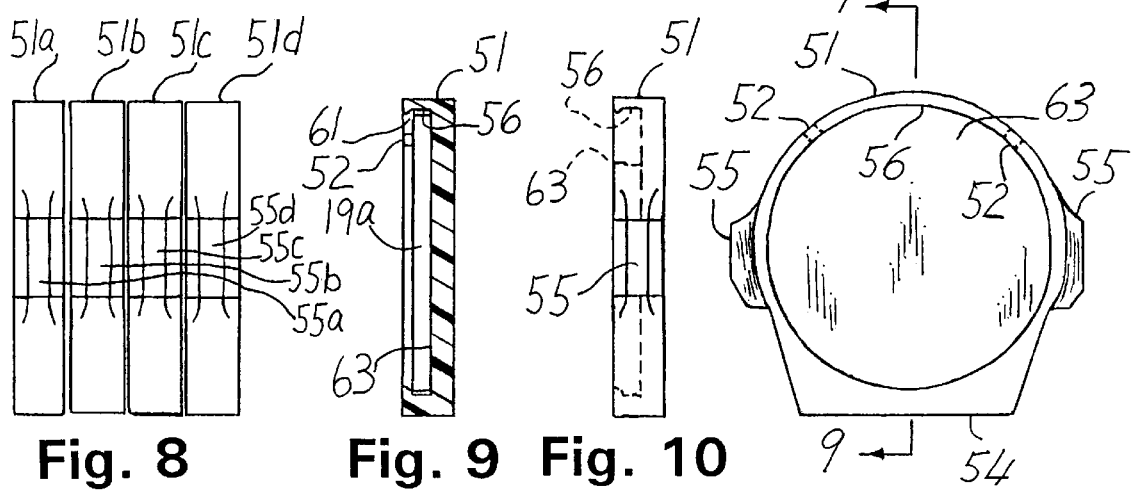

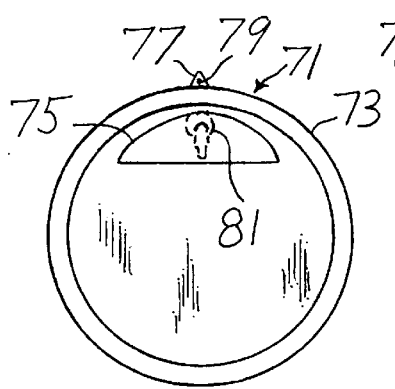
Fig. 12  Fig. 13
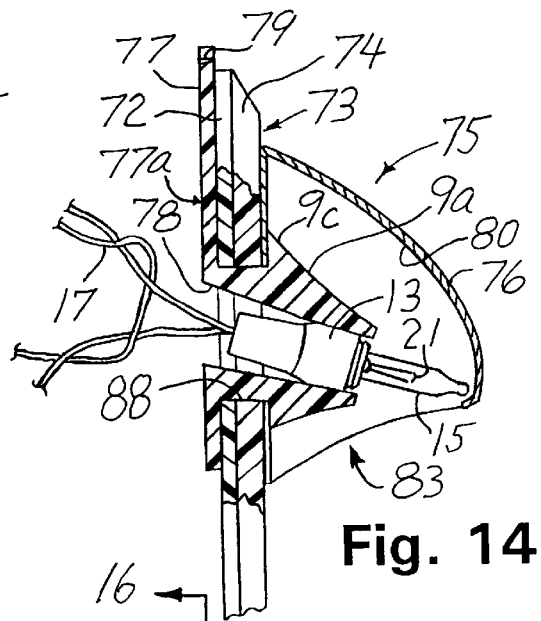
Fig. 14
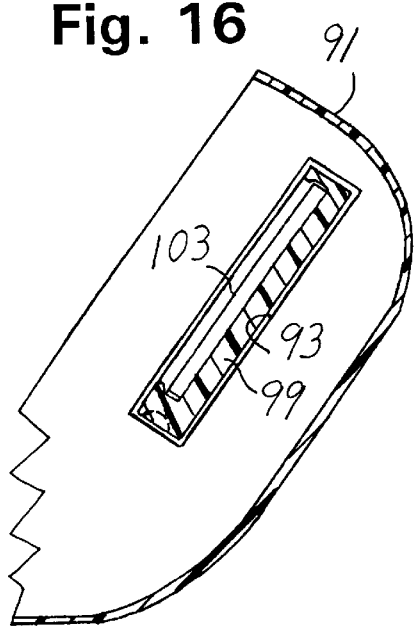
Fig. 16
Fig. 15
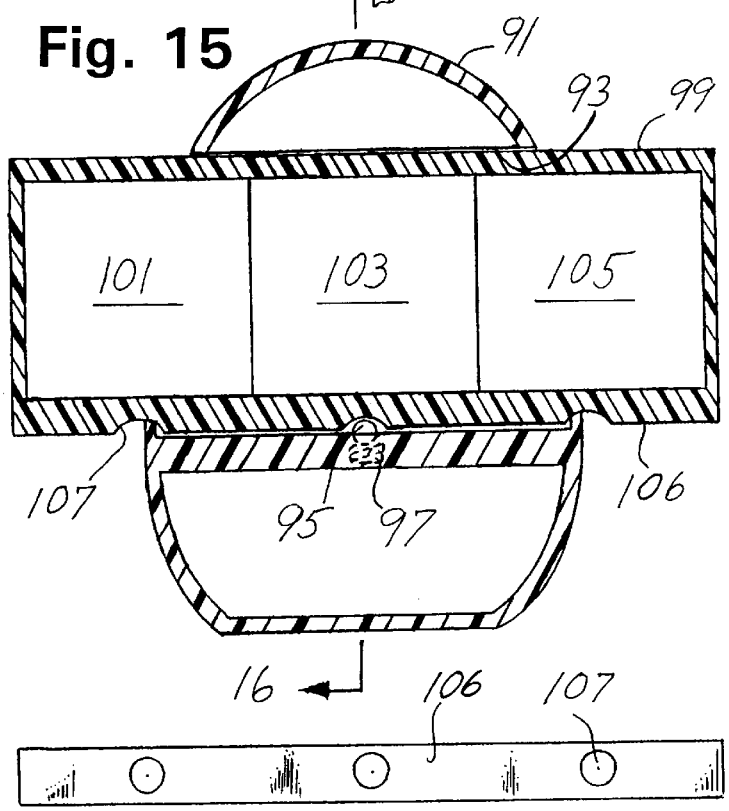
Fig. 17
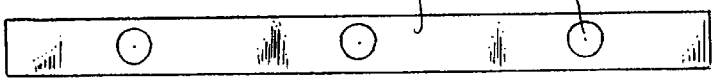

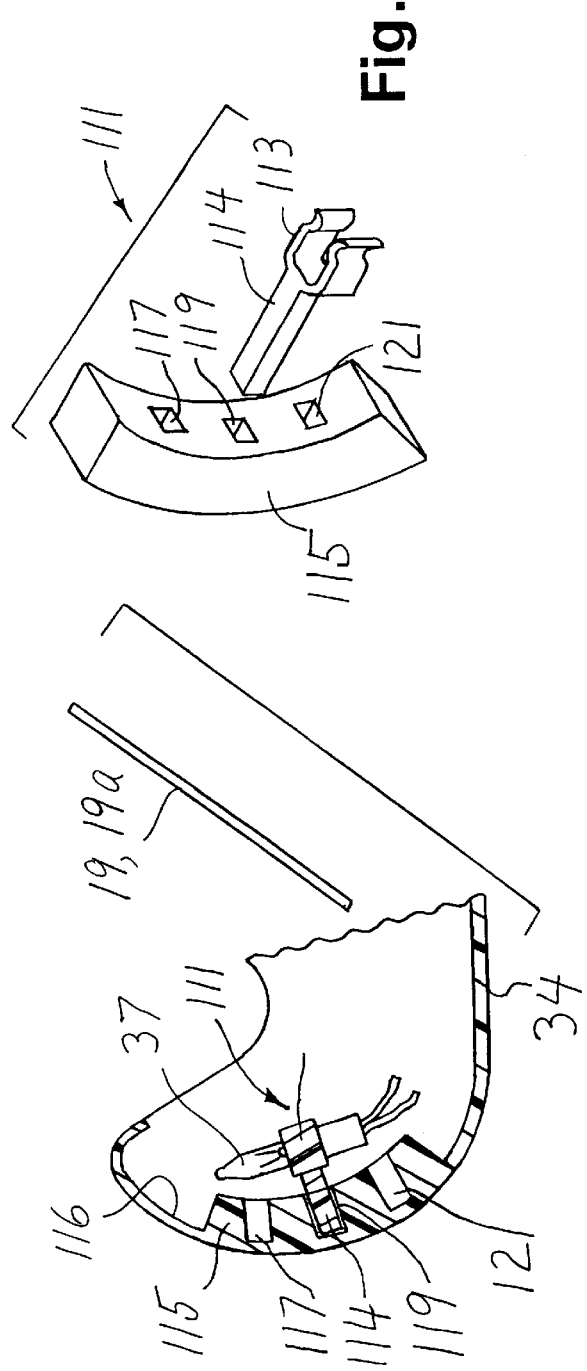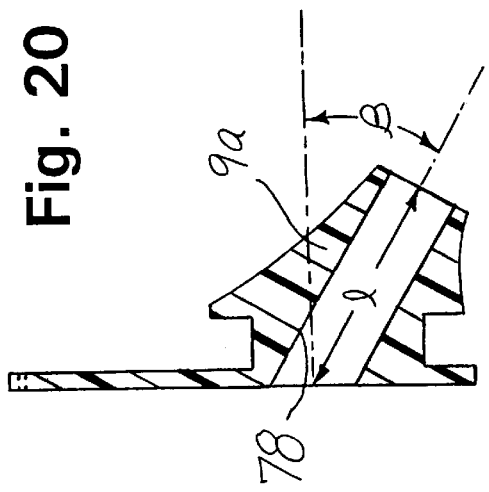

HOLOGRAM DISPLAY ITEM

BACKGROUND OF THE INVENTION

1. Field of the invention

This invention relates to displaying holograms, and more particularly to displaying front-lit, white light viewable, reflection holograms.

2. Brief Description of the Prior Art

Front-lit holograms are of one or more colors, known in the industry as either narrow band, full color, or broad band holograms. They are created or holographed with lasers onto one of many possible holographic film coatings such as silver halide, dichromated gelatin, or any number of photopolymers, which can be applied to any of a number of base materials or substrates. A typical substrate is glass, Mylar, or polyester-based film. A Protective or structural cover or coating such as glass, rigid plastic, or acetate may be laminated or otherwise applied to the developed substrate or base. Together, the base, the holographic image(s) thereon and any protective cover or coating are referred to in this specification as the hologram member ready for practical application.

Glossary of Terms

As used herein, the following definitions, synonyms, and different connotations of terms listed below, are offered to further clarify this specification for the layman as well as those knowledgeable in the art. The sets of terms listed below are closely related and may be used interchangeably here, unless otherwise stated. The usual use of such terms, in more than one context and connotation, serves to unburden the language of cumbersome redundancy and over-explanation, thereby enhancing communication for those knowledgeable in the art. Yet to the layman, the use of terms in different contexts and connotations may cause the appearance of less precision. For example, depending on its context the term "hologram" can have a structural or a visual connotation. Hence, one can speak of viewing a "hologram", rather than always refer to viewing a "hologram image" or a "holographic image". The glossary is therefore provided for convenience and to allow the specification to be written with less redundancy.

List of Terms

"Hologram" and "hologram member" (structural context): comprises a developed base material or substrate containing one or more holographic images; and any number of structural or protective laminations. The terms may be used in a physical or structural context, as in mounting a hologram within a display item housing.

"Hologram", "hologram image", "holograph", and "holographic image" are terms having an imaging connotation and used in a context as "viewing a hologram".

To "holograph", "create", "shoot" (as in shooting a camera): All refer to making an original (master) hologram or a production copy from the master.

"Hologram base", "hologram base material", "substrate": refer to any number of substrate materials including glass or polyester-based film, which contain, or to which is applied one of many possible holographic film coatings. (The term "base" is not to be confused with the invention's "base member housing" further defined below under "Housing".)

"Hologram master", "hologram original": refer to an original hologram from which reproduction copies are made.

"Reconstruction", "replay", "viewing": refer to recreating the hologram by impinging it with a single point source of light.

"Lamp", "light": refer to both a light "bulb" and "socket". When referring to "press fitting a light" the implied reference is to the insulated socket or base which actually makes the necessary contact for the press fit.

"Light source assembly", "light source": is meant a light bulb, or light bulb and socket, or a light bulb and/or a socket and/or light hood and/or mounting hardware.

"Light hood", "hood", "shield", "shroud": refers to the integral or separate-but-adjacent light glare shield. The purpose being to shield the viewer from glare of the light source, and to diminish extraneous light from outside the ornament. Comprises one of several components of a light source assembly.

"Grommet", "lamp holder" or "light holder": refer to the means of holding a lamp or lamp bulb in position by allowing a lamp's insulated socket or base to be press fitted into a converging flexible channel. The lamp holders described in this specification may be separate and exchangeable grommets, or converging "fingers" integrally formed with the housing.

"Base member housing", "housing", "housing member", refers to the stylized structure providing support for affixing a hologram and a light source assembly, integrally or otherwise.

"Display item", "item", "ornament", "invention": may refer to the embodiment of the invention, comprising the housing, the hologram, and the light source assembly.

"Hologram jacket", "hologram holder", "multi-hologram-image jacket", "holder", "(slide) magazine", "slide rack", "mounting", "insert", "disc", "frame": all refer to portable, separate-yet-interdependent, exchangeable devices in which holograms are protectively mounted and contained. The terms are used with and without the prefixes such as "hologram" or "multi-hologram". (Note: Since it is possible to create more than one hologram image on a single base or substrate, a "multiple-hologram-image jacket" may in fact contain a single hologram member.)

Distinguishing the meaning of "base" in the terms "hologram base" (substrate) and a "base member housing": The "hologram base", together with its holographic image(s), and any laminations, form the hologram member. The "base member housing" (housing) is a stylized support that may be used to affix a hologram member and a light source assembly. (Noteworthy exception: Since different components of the invention can be designed to serve dual functions, a hologram's base and any protective laminations of a hologram itself, could optionally be stylized and constructed to serve the dual function as both a hologram and a housing. Hence the terms "hologram base" and "base member housing" are usually distinguished unless they are used in the context of the above exceptional dual purpose.)

A single point source of light is critical for the enjoyment of viewing such holograms. Holograms are holographed with a laser light which is a single point light source, and they need to be viewed with a single point source of light for optimum results, as opposed to being viewed by a multiple point source or a diffused light source such as a fluorescent bulb.

The brightness level of the light source is a consideration for optimal enjoyment when viewing the hologram. Amber or clear bulbs are brighter and therefore more desirable than colored bulbs. Moreover, clear bulbs will offer a more faithful rendition of the coloring of the hologram image.

As mentioned above, holograms are holographed, or "constructed", with laser holography and shot at pre-designated angles from normal. "Normal" is a perpendicular line from the center surface of the hologram. In order to reconstruct, or replay, a hologram, a single point source of light (e.g., a bulb with a small filament) must be in a position and at an angle from normal for the most advantageous or aesthetic viewing of the hologram. The advantageous position and angle are either known or discoverable. Usually, the angle for advantageous viewing is similar to the angle used in the original laser light construction of the hologram, which is also known or discoverable.

Holograms have been widely known and adapted for use in a variety of ways. Traditional display of such holograms is accomplished by either: pre-designated track type or spot type lighting mounted separately from the hologram; or, the viewer trying to find an advantageous viewing angle from nearby coincidental light by trial-and-error.

One market application for such holograms has been to incorporate them in accessory items such as pendants and belt buckles, which have always been dependent on coincidental, available light. Unless the light is in precisely the proper location, the observer will not see the holographic effect, or the effect will be significantly diminished and/or discolored.

A more recent dominant commercial application has been in the youth market, where such holograms are mounted on collectable trading cards, or game pieces called "pog slammers". Both applications are subject to fortuitous, coincidental light for viewing.

There have also been hologram products intended as Christmas tree ornaments. They have tended to be of low quality and totally reliant on coincidental light from their surroundings for viewing.

The 3-D photography or stereography industry has had success in mass marketing its display devices or stereoscopes (such as the "View Master"), and companion stereograms or stereographs or 3-Dimensional pictures. However, stereograms are as easy to create as taking a photograph. The stereography industry has not had to deal with complex, highly technical, expensive production methods as have been associated with creating holograms, and with the hologram industry.

The hologram industry has been slow to innovate or develop a mass retail market. Major long-standing hologram industry bottlenecks have impeded the development of mass market applications that would have driven the reason to design and develop new and innovative display implements. In contrast, the stereogram industry had no obstacles to creating inexpensive originals or mass production of good quality stereograms.

The hologram industry is only recently overcoming its obstacles to mass production of inexpensive, quality holograms. Several industry bottlenecks have impeded the development of a mass market for holograms, (and subsequently the subject invention). Examples of such bottlenecks are: 1) The often prohibitively high cost in time and labor to create a good quality hologram original or master (from which production copies are made), and a scarcity of artisans skilled in sculpting the often required miniature subject sculptures used to holograph the master; 2) Until the recent ability to mass produce good quality, holograms on polyester-based film, the reproduction of holograms (on glass) has been labor and time intensive; 3) The inherent problem of slow turnaround times has caused the forfeiture of much business which has in turn slowed industry development; 4) The lack of knowledge and the uncertainty about the potential size, nature, preferences and acceptability of the market population, and the need to educate the market audience; 5) The subsequent lack of new market applications; and 6) The combined negative effect, of the bottlenecks as a whole, upon the motivation to invest in solving any individual bottleneck, when considering the interdependency of industry problems and solutions.

Subsequently, given the above industry bottlenecks, and the absence of new market applications, there has been a lack of will to develop innovative, low-cost display items. Furthermore, because a hologram may be viewed without a display item, unlike viewing stereograms, there has not been a market demand requirement or a market-driven urgency to invent the display item.

Accordingly, with the relatively recent advent of improved low-cost hologram mass production methods and materials, representing the removal of a key industry bottleneck, new market applications, such as holiday ornament display items, are now considered and possible, and consequently there is a need for new, low-cost hologram display items which provide: self-contained advantageous lighting, and optionally a means to provide more portability and to conveniently exchange holograms to and from the display item.

SUMMARY OF THE INVENTION

The present invention overcomes all of the above-noted deficiencies of the prior art by providing a hologram display item comprising a hologram having a front surface with a holographic image thereon and a rear surface. A light source assembly is also provided and is structurally connected to, and fixed relative to, the hologram at a position to impinge light energy onto the holographic image. In this arrangement, the light source is fixed relative to the holographic image so as to provide, at all times optimum viewing of the hologram by the observer independent of the position of the hologram display item relative to the position of the observer.

The light source assembly, fixed to the hologram display item housing, or provided light hood, emits light energy substantially from a point and at a predetermined angle for advantageous viewing, similar to the known or discoverable angle of original hologram construction.

Because the light emanates from a single point, its angle to the top of the subject cannot be identical to the angle of its beam at the bottom of the subject. When referring to angles of original construction or angles of production copying, the important angle for the purpose of the invention is the angle from the source to the center of the subject, and in the display item described and shown herein, it is the angle from the source bulb filament to the center of the hologram.

The theoretically ideal reconstruction (replay) of the hologram or holographic image would be the duplication of all the conditions of construction and copying. Given the constraints of a small, mass market display item, and the use of white light vs. laser light, it is impractical and implausible to virtually duplicate conditions of hologram construction. Therefore, the object of the invention is to provide predictable good quality replay by employing self contained lighting, that has some key similarities to the lighting used in construction.

Therefore, two important tasks of the invention are to use a single point source of light; and to position the light in a known or discoverable location and angle, to provide for the advantageous and aesthetic viewing of the hologram, whatever the location or angle is. Usually, the advantageous angle is similar to the angle of original hologram construction. Optionally, so as not to dedicate each housing, or light hood, to a specific angle, and to maximize flexibility, the invention provides a means of changing the position of the point light source without having to change the housing or light hood.

By employing light bulbs with smaller filaments, the invention approximates the small laser point source used during original hologram construction. Other things being equal, the smaller the filament and/or filament cross section or surface area directed at the hologram, the better the reconstruction of the hologram image. Hence, a bulb with a single filament may therefore be preferable to one with a double filament. Yet a double filament bulb may be adapted for hologram replay by simply aligning the filaments along a line passing through the center of the hologram so both filaments are not facing the hologram, thus narrowing the filament profile or surface area relative to the hologram, resulting in a smaller effective point source. Additional designs in the display item can help create optimum conditions for reconstruction and replay. One example is to provide a means to reduce stray or extraneous reflective light. One method of doing this is simply to blacken all interior surfaces of the light hood, or housing behind the bulb filament, so as to absorb extraneous light.

By "discoverable" is meant that an observer assesses the quality of the image as a point source of light is moved relative to the hologram until the best quality of image is observed. The ornament is then designed to position the light source at this "discovered" position, or a movable light source is moved and fixed at such position. By "light source assembly" is meant a light bulb, or a light bulb and socket, or a light bulb and/or socket and/or light hood and/or mounting hardware.

In another aspect of the invention, the hologram display item is an egg shaped Christmas tree ornament and the light source is a Christmas tree lamp, of a standard or custom string of Christmas tree lamps, the lamp having a bulb and socket and the light source of the hologram display item includes a resilient tubular portion within which the socket of the Christmas tree lamp is pressure fitted. As a Christmas tree ornament, the top of the hologram display item may have a projection with an eyelet in it for accommodating the looped end of a standard Christmas tree hook, in order that the hologram display item can be hung from a limb of a Christmas tree.

In yet another aspect of the invention, the housing for the hologram display item may have a slot in it for accepting replaceable jacketed holograms. In this way, the hologram display item can display different holograms for different purposes, e.g. a different hologram can be used for different seasons of the year. This version's special jacket, or holder is designed to contain an individually mounted hologram with its individual holographic image. The single-hologram jacket and the item's housing are separate-yet-interdependent components of the invention.

In an interactive embodiment of the invention, the slot can pass completely through the display item housing, and a number of holograms can be contained in a multiple hologram jacket, slide rack, holder, disc, or other convenient configuration so that the observer can selectively view the holographic images by manually advancing the multiple-image holder through the slot from one image to another. The above multiple-hologram jacket may be fitted with separate and adjacent hologram members, or optionally may be fitted with a single hologram member containing multiple-hologram images.

Instead of mounting the hologram in a separate housing, the hologram itself can be constructed to serve the dual purpose of a hologram and a housing to accommodate the mounting of a light source assembly, complete with adjacent light hood. This will present a simple, low-cost attractive display item which, nevertheless, possesses all of the optimal viewing angle features and fixed light position aspects of the invention as described above.

The invention is thus an implement for displaying front lit, white light viewable, reflection holograms, in a self-contained package, comprising a base member housing which has means for: affixing a hologram directly onto the housing, or optionally, affixing the hologram onto a separate, exchangeable hologram holder or frame or slide or "jacket", and then positioning the jacketed hologram into position in the display item housing; affixing a single point source of light (e.g., a bulb with a small filament), within the housing in a position that accommodates advantageous viewing, whatever the angle, and optionally aligning the bulb to present the smallest surface area or cross section of its filament toward the hologram subject; and further optionally providing the means to vary the angle and position of the light bulb to conform to different known and discoverable angles of light that accommodate advantageous viewing, and to do so without replacing or altering the housing.

In a simplified version of the invention, the glass base and laminated beveled plastic cover are constructed such that the hologram member itself serves the dual function. There is not a separate housing member, and the light source resides within an integrally formed hood, or within a separate but adjacent hood mountable on the modified hologram member.

According to a specific embodiment of the present invention, the housing is styled as an egg-shaped holiday ornament, wherein a round opening in the upper back is fitted with a custom rubber grommet, the forward portion of the grommet forming a converging, narrowing channel, to provide for press fitting a standard or custom holiday string light into a position predetermined to emit light at an angle for advantageous viewing which is usually similar to the known or discoverable angle of original hologram construction, and optionally, to present the smallest surface area and cross section of the light bulb filament to the hologram subject.

The upper forward portion of the egg-shaped housing serves as a light glare shield, cover, or hood, the end of the hood curling down and back slightly to provide additional means of positioning the light bulb, by the abutment of the end of said bulb against the inside end of the hood. An eyelet may be molded into the top of the hood for suspending the ornament.

The front of the egg-shaped housing has a concave opening to reveal or display the hologram. Midway in the housing, a pair of vertically oriented ribs, or a substantially vertical wall facing the front, serves as a means to affix a hologram.

In another embodiment of the invention, the display item housing is designed to rest on a table by means of a flattened base, or to be hand held. A permanent light fixture and glare shield are positioned forward from the housing base. Means of affixing a battery is provided, along with a three-position battery light switch affording the positions: stays "on", stays "off", and "on while pressing".

As mentioned above, holograms are holographed at various angles. Importantly, then, there is an advantageous position or angle of the light source for reconstruction that is known or discoverable. With the present invention, optional means is provided for affixing the point light source at various angles in relation to the center of the plane of the hologram image, and to do so without replacing or modifying the housing. The optional means is an adaptive tool, accommodating whatever light angle provides the most advantageous and aesthetic viewing or replay. In this optional embodiment, a separate "gripper" and "shaft" part is used. The light is snapped into place and held by the "gripping" end. The shaft is then inserted, and adhered, into one of a series of holes molded into the glare shield or light hood, opposite the hologram plane. By use of the series of molded holes, and by varying the length of the "gripper" shaft (by cutting it), the position of the light can be varied to customize the position and angle of the point light source without changing the housing.

In a modified embodiment, a table top hologram ornament version of this invention is provided. With it, two variations of the ornament base member housing are intended, one with the light source assembly located at the bottom of the housing, projecting light from below the hologram, and optionally, another with the light source assembly located at the top of the housing projecting light from above the hologram. In either case, the lamp filament will provide a point light source at an optimal angle for impinging the hologram inserted in the housing. Instead of having a permanently mounted hologram, a slot may be provided in the housing so as to accommodate, for example, an insertable separate-yet-interdependent exchangeable hologram holder or "jacket" containing the hologram.

Another embodiment of the invention provides a means for exchanging holograms with a multiple-hologram "jacket" (holder or rack or slide). The multiple-hologram "jacket" itself is a generally rectangular frame-like device with an inside perimeter channel provided as a means of pop-fitting or snapping into position a series or set of holograms having a glass base with a laminated plastic cover. Such holograms themselves may be rectangular, circular, oval, square, or other desired shape. The jacket is flexible, and the hologram is held in place by a molded ridge or intermittent molded bumps along the forward edges of the jacket's inside perimeter channel. In this embodiment, three adjacent holograms reside equally apart within the multiple-hologram jacket. The bottom of the jacket is notched in alignment with the center of each hologram for the purpose of positioning each hologram in the housing slot at the optimum viewing position relative to the fixed point light source. The multiple-hologram jacket in this embodiment could optionally contain an elongated multiple-image hologram having a single glass base and plastic cover in common. This optional case is possible because multiple hologram images can be holographed onto a single hologram base.

The housing provides a through-open slot or channel which matches the end of the jacket, to receive, position, and advance the multiple hologram jacket. In this embodiment the slot is angled back slightly for convenient viewing of the holograms when the display item is residing on a table top. The base of the slot has a spring-loaded ball bearing, protruding from the center point of the base of the slot, which is also opposite the center of the light source. As the multiple-hologram jacket is manually advanced along the through-open slot, the spring-loaded ball bearing aids in positioning the hologram in front of the light by nesting in each sequential jacket notch.

The jacket and housing are separate-yet-interdependent exchangeable components of the invention. Their compatible design is necessary to the carriage, protection, positioning, viewing, and exchange of holograms.

In the embodiment of the invention where the hologram and housing are in dual function, the modified glass base and laminated plastic cover of the hologram serve a dual purpose as a display item housing and a hologram, thereby creating a hologram ornament. In this embodiment, the glass base and plastic cover are in the shape of a disk, with the exception that the plastic cover is beveled at its edge. The dual purpose hologram may be referred to as a beveled-edge hologram member. The resulting ornament shall be referred to as a beveled-hologram ornament, or as a beveled-edge "glass" ornament.

The position of the light needs to be at, and is determined by, the angle of light that provides for best replay and viewing, the angle usually being similar to the angle of original hologram construction. The object of the invention is to accommodate or provide a light that is positioned to emit light at an angle best for replay and viewing (whatever the angle). Therefore, one function of the invention is to provide a means of varying the position of the light, without replacing or altering the beveled-edge hologram member.

The means of positioning a light may be provided by a hole made into the upper portion of the beveled-edge hologram member, a custom rubber grommet with a converging, narrowing channel to accommodate a press fit of a standard or custom holiday string light, the channel molded at one of a series of pre-designated angles, and optionally, the possibility of abutting the end of the bulb to the inside end of the light glare shield or hood. By providing grommets of varying lengths and angles, and optionally varying the shape of the glare shield, the light can be positioned to emit light at a variety of angles to the center of the hologram, the purpose being to provide the flexibility to approximate the light angle used in hologram construction, without changing the beveled-edge hologram member. The "gripper and shaft" arrangement previously described can also be adapted to the beveled-edge hologram member and light hood embodiment of the invention.

A stamped metal light glare shield or hood is installed into position within the hologram ornament by sliding its back circular opening over the front of the grommet, and, temporarily deforming the grommet, continuing towards the back until the back of the hood is flush against the front of the beveled base, and the grommet has returned to its intended shape. The hood is held in place by the force developed between the beveled-edge hologram member the grommet. The back of the grommet is modified with a vertical extension serving as an eyelet for suspending the ornament. This embodiment provides the means of the appearance of an etched glass, or snowflake, type ornament.

BRIEF DESCRIPTION OF THE DRAWING

The invention will now be described having reference to the accompanying drawings in which:

FIG. 5 shows an alternate embodiment of the invention where the light source may be provided at either the top or the bottom of the housing, and the housing has a slot in it to accommodate replaceable holograms;

FIG. 6 is a front view of the display item of FIG. 5 using only a single, lower, light source;

FIG. 7 is a side view of the display item of FIG. 5 without a top light source and showing a jacketed hologram inserted in the viewing slot of the housing;

FIG. 8 shows how a stack of jacketed holograms fit closely together so as to be accommodated in a hologram collection container (not shown);

FIG. 9 is a cross sectional view of a jacket for holding a hologram, taken along the lines 9—9 of FIG. 11;

FIG. 10 is a side view of a jacket for containing a hologram;

FIG. 11 is a front view of the hologram jacket shown in FIG. 10;

FIG. 12 shows an alternative embodiment of the invention in which the hologram display unit comprises the hologram itself with a light source attached thereto and a hanger receiver on its rear side;

FIG. 13 is a left side view of the hologram display item of FIG. 12;

FIG. 14 is a partial cross sectional view of the top portion of the embodiment of the invention shown in FIG. 12;

FIG. 15 illustrates a front cross sectional view of a variation of the slotted housing embodiment of FIG. 5 with the slot passing through the body of the display item for accommodating a magazine of holograms mounted on a slide;

FIG. 16 is a partial cross sectional side view of the embodiment of the invention shown in FIG. 15;

FIG. 17 is a bottom view of the magazine of holograms in the hologram display unit shown in FIG. 15;

FIG. 18 is a partial cross sectional cutaway side view which shows a modification of the light source mounting scheme in which the light source may be varied in position and angle;

FIG. 19 is a perspective view of the variable position mounting apparatus shown in cross section in FIG. 18; and FIG. 20 shows an variation in angle and length of a custom grommet or lamp holder which could apply to any of the lamp holders of FIG. 1, 3, and 14.

DETAILED DESCRIPTION OF THE PREFERRED EMBODIMENTS

Figure 1:
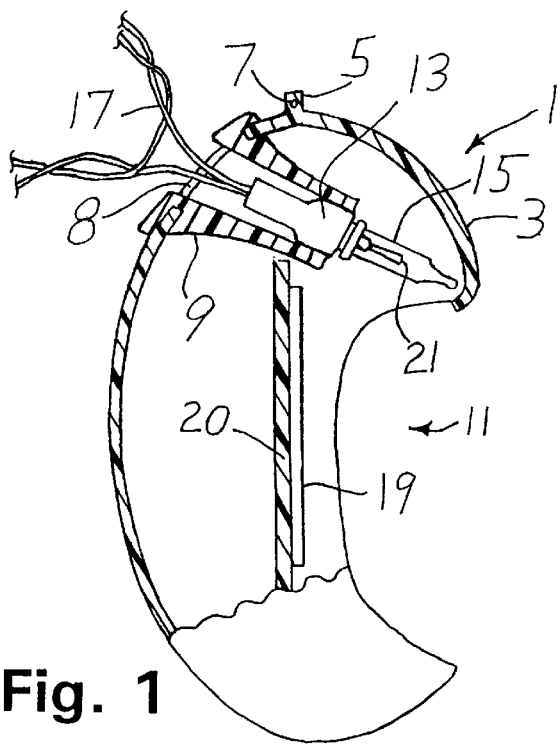
FIG. 1 is a partial cross section of an egg-shaped configuration of the invention, the hologram display item being in the form of a Christmas tree ornament.

In the partial cross sectional view of FIG. 1, the hologram display unit of this invention is shown in the shape of an egg for use as a Christmas tree ornament 1. The ornament 1 includes a substantially egg-shaped housing 3 having a projection 5 at its top rounded portion and an aperture 7 piercing projection 5 to accommodate the looped end of a standard Christmas tree ornament hanger. A circular opening 8 is provided at the rear top of the housing 3 to accommodate one of a number of selectable lamp holders 9 which is a grommet made of flexible material such as rubber or plastic and which can be pushed into hole 8 until it snap fits about the periphery of hole 8 and is in a position to receive a standard string-light Christmas tree lamp bulb 15. The typical Christmas tree string of lights has a number of lamps 15, 13 either connected serially or parallel to other lamps by means of electrical conductors 17. Each lamp bulb 15 has a lamp base 13 which can be press fitted into the central opening of lamp holder 9 in an interference fit, i.e. it will stay with substantial holding force but is readily removable if desired.

The housing 3 has integral strips 20 along opposite side walls of housing 3 against which the back side of a hologram 19 is secured by, for example, gluing. Of course, any other means of mounting hologram 19 within the housing 3 would fall within the scope of the present invention. For example, a solid integral internal wall, also represented by numeral 20, extending from side-to-side within housing 3 may be more convenient for mounting a hologram with adhesive, cohesive, or double back tape.

Figure 2:
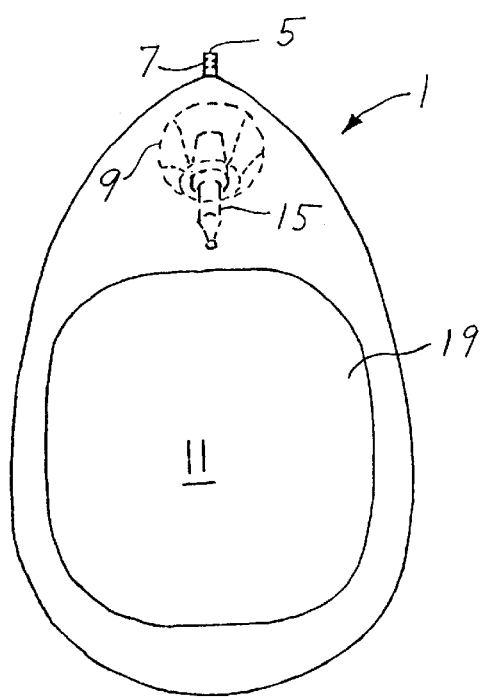
FIG. 2 is a front view of the hologram display item of FIG. 1.

As indicated above, it is important to have a point light source impinging the hologram 19 at a specific angle in relation to the center of the plane of the hologram. The arrangement of FIG. 1 shows the construction to produce this desirable result by having the filament 21 of the Christmas tree lamp bulb 15 at precisely the correct position relative to the front surface of a vertically mounted hologram 19. The egg-shaped housing 3 has a rather rounded rectangular opening 11 (FIG. 2) through which an observer can see the internally mounted hologram 19. The shape of the opening 11 shown in FIG. 2 is, of course, arbitrary, and the rounded rectangular form is shown for illustrative purposes only.

Figure 3:
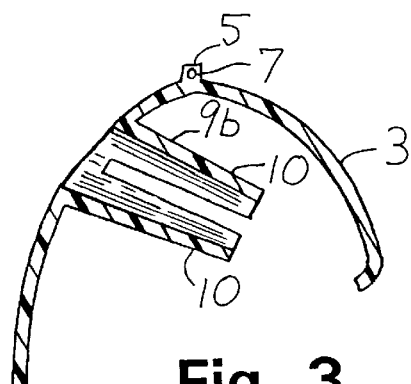
FIG. 3 is a partial cross sectional view of the top of the hologram display item of FIG. 1 with the bulb removed.

FIG. 3 depicts an alternative arrangement for accommodating a Christmas tree, or other type, lamp, in that the lamp holder 9b is shown to be integrally formed with the housing 3 of the display item 1. Being made of plastic material, which may be stiffer than the suggested rubber or flexible plastic lamp holder 9 of FIG. 1, the lamp holder 9b of FIG. 3, in order to provide flexibility, is constructed having a number of cantilevered fingers 10. When the lamp base 13 is pushed into the opening of lamp holder 9b, the ends of fingers 10 will flex outwardly to apply inwardly directed holding pressure against the base 13 of the lamp.

Figure 4:
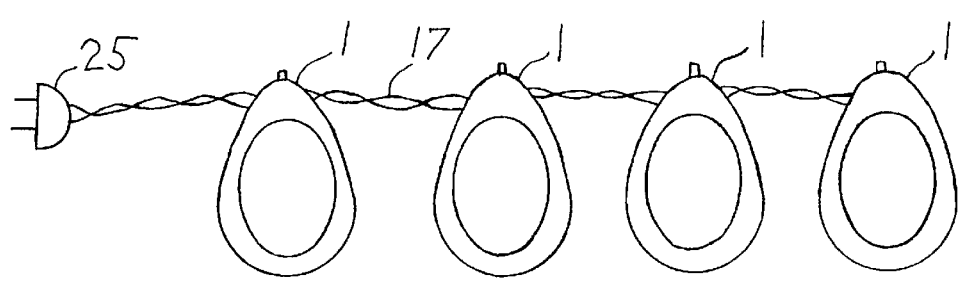
FIG. 4 illustrates the manner in which a series of hologram display items can be strung on an electrical cord so that power supplied to the electrical cord will power the light source for all of the connected display items.

FIG. 4 simply indicates that, when used as a Christmas tree ornament, the hologram display item 1 of the present invention can be duplicated so that a number of such display items can be strung along a connecting conductor wire 17, and the entire unit plugged into a convenient wall outlet by means of a plug 25. Instead of using one or more lamps of a Christmas tree string of lamps, FIG. 4 suggests the possibility that a number of hologram display units can be manufactured and sold as a string of interconnected units ready for hanging on a Christmas tree, along a window sill, along hooks or nails on a wall, as a decorative portion of a table or counter display, etc. As will be pointed out more clearly later, instead of using a light source from a Christmas tree string or a dedicated string of lights as shown in FIG. 4, a self-contained battery/lamp combination can be provided so that a hologram display item is fully self-contained and can be enjoyed without need for external power being applied. Of course, depending upon the particular application for the display item, and whether or not the display items will be connected in a string along an electrical conductor, and other considerations, the voltage and amperage of the lamp for each application must be carefully chosen to provide a minimum required brightness. For retail store displays and the like, even more care may be taken to provide the optimum voltage and amperage ratings for the bulb to provide the optimum image display satisfaction to the observer.

In FIG. 5, a table top version of the hologram ornament of this invention is depicted. A base member housing 33 is shown which accommodates a lamp bulb 37 positioned above, or a lamp bulb 39 positioned below, providing a single point light source for impinging the hologram inserted in housing 33. The top bulb 39 is shown to be encased by a phantom portion of housing 33, indicating that it is an optional variation of the FIG. 5 embodiment. The base 34, of housing 33 may be flattened so as to permit the ornament to sit on a table or shelf or piece of furniture. The FIG. 5 embodiment, with or without a flat base 34 is also comfortably hand held.

Instead of having a permanently mounted hologram 19 as shown in FIG. 1, FIG. 5 provides a slot 35 in the housing 33 so as to accommodate, for example, an insertable separate-yet-interdependent exchangeable hologram, i.e., FIG. 5 shows a jacketed single-hologram version of the invention. Since the embodiment of FIG. 5 uses a battery 43, it is important to limit the time the bulb 37 or 39 is on, and this is accomplished by means of the provision of switch 41 mounted on the side of housing 33 and shown in FIG. 5 as a slide switch. The switch preferably has "stays on", "stays off", and "on while pressed" positions. The electrical circuit of FIG. 5 is a series circuit, meaning that the bulb 37 or 39 and the switch 41 are in series with the battery power source.

FIG. 6 illustrates the same embodiment of the invention as shown in FIG. 5 but with a jacketed hologram 19a inserted in slot 35 (FIG. 5). With further reference to FIGS. 6–11, various views of the jacket 51 for hologram 19a are presented. In order for the holograms to be exchangeable, and conveniently so, the jacket 51 must be interdependent with the housing 33. That is, the housing 33 and the jacket 51 must be designed together. FIG. 7 shows a jacket 51 inserted into the slot 35 of housing 33, FIG. 8 shows a stack of jackets 51a–51d in side view, FIG. 9 shows the cross sectional view of the jacket illustrated in front view in FIG. 11, and FIG. 10 shows a complete side view of jacket 51 with internal features shown in phantom.

Jacket 51 is conveniently shaped so as to be accommodated in slot 35 and has a circular opening 56 to accommodate a correspondingly circular shaped hologram 19a, although the shape may be oval, square, rectangular, or any other desired shape. The back surface 63 of jacket 51 is shown to be flat, the same as the back surface of the hologram 19a. The top or side edges of jacket 51 may provide a place to identify the hologram subject and other information.

On each side of jacket 51 are protruding ears 55 which project radially outwardly so as to be easily grasped by the user. This is particularly useful for removing the jacketed hologram from slot 35 when it is desired to exchange holographic images. FIG. 6 shows that the ears 55 project sufficiently outwardly such that a user's finger and thumb can easily, and tightly, hold the jacket 51 fully clear of the outer surface of housing 33 and switch 41.

For interchangeability of holograms in a jacket 51, there are provided small access and expansion gaps 52 in the outer periphery of jacket 51 and an inwardly directed projection 61. The inwardly directed projection 61 may be small bumps spaced along the inner periphery of the front opening of jacket 51 or may comprise a continuous molded ridge which surrounds the inner peripheral surface of such opening, except for the small gaps 52. Since the material of jacket 51 is plastic, polypropylene for example, in combination with the small expansion gaps 52, it will "give" when a disk-shaped hologram 19a is pushed inwardly toward the rear surface 63 of jacket 51. After it is in place, and it is desired to remove the hologram 19a, this is done simply by putting a thin tool, paper clip, or the like into one or both of gaps 52 and prying against the back of hologram 19a to urge it out pain a more junctions 61.

In a more simplified version of the invention, FIGS. 12–14 show a completed hologram display item as a beveled-edge "glass" ornament, in which the hologram 73 itself, comprising its glass base 72 and laminated plastic cover 74, serves a dual function as a hologram and a housing referred to here as a "beveled-hologram housing member" which provides support for a light source 75 and a hanger 77. The plastic hologram cover 74 preferably has a beveled edge 74. The hanger 77 has a hole 79 therein, again for receiving the looped end of a standard Christmas tree ornament wire hanger, and, as seen in FIG. 13, the hanger 77 is of sufficient length to provide an area against the back side of hologram 73 to give the required support. Hanger 77, for example, can be applied to the back of hologram 73 by any appropriate adhesive or double-backed tape. However, hanger 77 is preferably integral with a lamp-holding grommet and can be attached to the hologram without adhesive, as will be described below.

The light source assembly 75 is in the shape of a short hood having an opening 83 out of which the light energy from a lamp 81 projects. The physical arrangement shown in FIG. 13 might not put the point light source at the preferred angle as earlier noted to be important, but it could do so if the light source 75 was extended further outwardly from the front surface of the hologram 73. The FIG. 13 illustration thus may be scaled to produce the optimum light impingement angle. The large angle (from normal) of the light source to the hologram in FIG. 13 simply indicates one application of the invention in which the display items may be mounted in a fairly dark lit environment, so that the loss of efficient light reflection of the image is not as important as the compactness or smaller overall size of the hologram display item. In any event, as with all of the other embodiments described in this specification, the light source 75 may be located in a fixed relationship to the hologram 73 so as to provide the aforementioned advantages.

FIG. 14 is a partial cross sectional view of the top of the hologram display item of FIG. 12. Here, instead of a flat hanger 77 described earlier, hanger 77 is shown to be formed so as to have a flexible lamp holder portion 9a passing through a hole 88 in hologram 73, and the back portion 77a is held against the rear surface of hologram 73 by the clamping action of the barbs 9c which snap into position on the opposite side of hologram 73 from the flat portion 77a. The custom molded rubber grommet 9a with its converging channel 78 press fits the base 13 of the string light bulb 15 into position at a specific angle in relation to the center of the plane of the hologram 73. Different lengths and angles of channel 78 may be selected to complement different lamp types and sizes. If the shroud or hood or shield 76 of the light source 75 is made of thin metal, paper, or plastic, it may not have to be adhered to the front surface of hologram 73, but can be held in place by barbs 9c of the lamp holder 9a as shown in FIG. 14. In order to best simulate a point source of light (the filament 21 of lamp bulb 15), the inside surface 80 is painted flat black or is otherwise made nonreflective. This would also apply to the portions of the housings 3, 33, 91 shown in FIGS. 1, 5, and 16.

FIGS. 15–17 illustrate yet a further embodiment of the invention maintaining the same common unique feature of providing a fixed point light source for impinging on a hologram to be displayed.

The embodiment of the invention in FIGS. 15–17 shows the possibility of having, not only interchangeable holograms to be displayed, but to have a number of holograms in a single magazine or frame so as to be able to instantly switch images without having to remove a jacketed hologram as was the case with the embodiment of FIGS. 5–7. This embodiment of the invention is thus referred to as a multiple-hologram jacket version.

FIG. 15 is a front cross sectional view of this alternative embodiment in which the hologram display device has a housing member 91 with a channel or slot 93 created to extend completely through from one side to the other of housing 91. A slide magazine 99 shown to be able to hold three holograms 101, 103, and 105 (but could accommodate any number of holograms, depending upon need and design) is shown to be positioned within slot 93 and with the center hologram 103 in a viewable position. For convenience only, the position of a light source in FIGS. 15 and 16 is omitted, since it would be similar in concept and operation to that previously described.

To maintain the magazine 99 in place, a captured ball bearing 95 is spring biased upwardly as shown in FIG. 15 by a compression spring 97. The bottom edge 106 of the magazine 99, also seen in FIG. 17 in edge view, has a detent 107 in the center position of each hologram 101, 103, and 105. In this manner, the user can simply move the magazine 99 left and right which will cause the bottom notch or detent 107 to cam the spring loaded ball bearing 95, nested in a jacket notch 107, downwardly against the bias of spring 77 as the flat lower surface 106 of magazine 99 passes by until the next detent is positioned at the ball 95, at which time the spring pushes the ball 95 upwardly and, not only indexes (i.e., centers) the hologram in housing 91, but also fixes the hologram at a particular position relative to the lamp source (not shown).

A partial cross sectional view of this arrangement is shown for additional explanatory purposes in FIG. 16. The cross section is taken along the lines 16—16 in FIG. 15.

The cross sectional view in FIG. 16 is not complete, as only the parts of the display item which appear to need additional illustration are shown, and those parts not needed for illustrating what is intended to be shown in FIG. 16 are omitted.

FIG. 18 shows an arrangement for mounting the point light source at selectable angles and positions inside base member housings 3, 33, or 91. In FIG. 5, such arrangement can be employed for either the upper light source 39 or the lower light source 37; and in FIG. 12, such arrangement can be employed for the light source 75.

In FIG. 18, a molded-in raised portion 115 is provided, although a separate raised portion 115 could be glued, sonic welded, or otherwise fixed to the inside surface of the housing.

More specifically, FIG. 18 shows a side view cross section cutaway of an optional light shield component and light source assembly which provide the means to optionally vary the position of the light bulb 37, to provide the flexibility of emitting light at different angles to the center of the hologram 19, 19a, to approximate varying angles for advantageous viewing, without changing the housing. A lamp holder 113, 114 is provided comprising a "gripper" 113 and shaft 114. The lamp "gripper" 113 provides a holding force contact with the socket or base of bulb 37 as the socket is snapped into place. A series of holes 117, 119, 121 are provided in a molded raised portion 115 of the shield 116, with a lamp holder shaft 114 inserted into one hole 119, the shaft 114 positioning the bulb 37 in relation to center of the plane of the shown hologram 19, 19a.

A perspective view of the raised portion 115 and lamp holder 113, 114 shown in FIG. 19 reveals the raised molded portion 115 described above, and the "gripper" part 113 that "grips" the insulated base of the light bulb 37 and positions the light by the insertion of shaft 114 into one of the series of holes 117, 119, 121. By the optional series of holes 117, 119, 121 molded into the shield, and by the varying lengths of "gripper" shafts 114, as by cutting shaft 114 to a custom length, a means is provided to change the position and angle of the light without changing the housing.

FIG. 20 is a side cross sectional view of an optional grommet 9a. Shown is a custom grommet 9a, one of a series, with a channel 78 having varying lengths l and angles β, thereby providing an economical means of affixing the light 15 at variable positions and angles to emit light at angles for advantageous replay and viewing, within the same housing, without changing the housing. A selected grommet 9a can be substituted for grommets 9 and 9a (FIGS. 1 and 14) previously described.

The above components and component functions combine to form new ways of displaying front-lit reflection holograms. The incorporation of the resident light source with the hologram housing affords predictable, on-demand, quality display, and portability, resulting in a new and beneficial exploitation of the hologram, which is expected to serve as a boost to the hologram industry. Without pre-designated lighting conditions and viewing a hologram with a light source from distant lamps mounted along a lighting track, the viewer currently needs to locate acceptable advantageous lighting conditions from coincidentally available light by trial-and-error manipulation of the hologram or positioning of his or her head.

Variations of the particularly described elements shown in the drawing are, of course, possible without deviating from the spirit and scope of the invention. For example, if the light source is a lamp from a string of lamps, the lamp holder 9, 9a which accepts a Christmas tree lamp, in a press fit, can be accomplished in numerous ways such as: a rubberized grommet, a channel of converging "fingers" injection molded into the "hood" component of the light source, or convex steel springs. The mounting/housing component can be designed and stylized in a wide variety of ways to serve a specific market application and segment, such as the holiday ornament market. Components making up the invention can be configured to serve multiple functions. For example, the hologram base and cover could be modified to serve the dual use as a hologram and a housing, an example of which is shown in FIGS. 12–14 where the hologram glass base 72 and laminated plastic cover 74 serve such a dual purpose.

There are many ways to fit holograms in their jackets. A few examples were presented above, and other ways are possible and would apply to jackets containing either single holograms or a series of adjacent holograms. If the hologram member has a rigid form, having been made with a glass base and with a glass or plastic cover, then a jacket design could accommodate a snap-in, or a pop-in fit, and the glass/plastic disc would reside in a channel confined by a ridge or mold bumps (FIGS. 9–11). Alternatively, the hologram can be mounted with adhesive or cohesive on the inside back of a jacket. If a hologram is made on a film base, and processed as a pressure sensitive hologram sticker, then the hologram could be adhered as a sticker onto the inside back of a jacket.

The present invention has particular application to the holiday ornament niche market category. Holiday hologram type ornaments are almost non-existent. The available ornamental hologram products are low grade, have no resident self-contained light source, and are completely dependent on locating acceptable advantageous lighting, by trial-and-error manipulation of the hologram, from available coincidental light in their surroundings for viewing. The entire category of holiday ornamental holograms has been hindered partly because of the intrinsic nature of ornaments. It is not customary to remove and handle tree-hung ornaments in order to manipulate them for access to available light, and at night there usually is no adequate or convenient available light source. Stationary holograms, such as ornamental holograms, require special lighting for the reasons given above. Therefore, the subject invention fills a long felt need in the art for front lit holograms as holiday ornaments.

Of course, there are many ornamental products that do not incorporate holograms, but that utilize standard string lights as a light or energy source. With a popular version of such products, the ornament completely surrounds the light bulb. The "ornamental event" is often achieved by the partial translucence of the ornament housing, and by the subsequent enhanced representation of an object. The object's housing is the main ornamental event. The light is intended to be thrown outwardly, through the ornament and toward the viewer. Examples are ornaments which have been formed and decorated as pumpkins or as Santa Claus busts. Other ornamental products that don't incorporate holograms, but that do utilize standard string lights, incorporate such string lights as the light source for items like stylized ornamental street lamps or a candles, and they are used to add light to the ornament's stylized housing subject or to serve as a functioning ornamental street lamp or candle. In other cases of ornaments that don't incorporate holograms but that do utilize standard string lights, the light is again intended to be emitted either outwardly toward the viewer and/or onto the stylized housing subject.

Conversely, with the hologram ornament, the ornamental event is not in the translucence of the ornament's housing, nor in the lighting of a stylized housing base member, but rather in the use of the self-contained light source to reconstruct a hologram, thus creating a new type of ornament. The light source is intended to emit light onto a hologram for reflective replay.

Other improvements and modifications of the invention than those illustrated and shown herein could be made without departing from the spirit and scope of the present invention, and it is to be understood that the invention is not to be limited by the specific embodiments shown and described, but rather by the appended claims.

We claim:

1. A front-lit hologram display item comprising:
   a hologram having a front surface and a rear surface, said hologram displaying a holographic image when said front surface is illuminated;
   a light source assembly structurally coupled to, and fixed relative to, said hologram at a location in front of said front surface to impinge light energy onto said front surface of said hologram;
   a housing; and
   light source assembly mounting means for receiving said light source assembly and for fixing said light source assembly relative to said housing, thereby fixedly positioning said light source assembly at a prescribed location in said housing and in front of said front surface of said hologram; wherein
   said light source assembly comprises a standard string-light Christmas tree lamp comprising a bulb and a socket; and
   said light source assembly mounting means comprises a resilient tubular portion within which said socket of said Christmas tree lamp is pressure fitted.

2. The display item as claimed in claim 1 wherein:
   said housing has an opening for receiving said light source assembly mounting means; and
   said light source assembly mounting means comprises means for engaging the periphery of said opening.

3. The display item as claimed in claim 2, wherein said means for engaging the periphery of said opening is a flexible grommet selected from a number of available grommets having varying lengths and angles of support for said light source assembly.

4. A front-lit hologram display item comprising:
   a hologram having a front surface and a rear surface, said hologram displaying a holographic image when said front surface is illuminated;
   a light source assembly structurally coupled to, and fixed relative to, said hologram at a location in front of said front surface to impinge light energy onto said front surface of said hologram;
   a housing; and
   light source assembly mounting means for receiving said light source assembly and for fixing said light source assembly relative to said housing, thereby fixedly positioning said light source assembly at a prescribed location in said housing and in front of said front surface of said hologram; and wherein
   said housing comprises:
   a second light source assembly fixed on said housing spaced from said first-mentioned light source assembly and in a position to impinge light energy onto the front surface of said hologram; and
   an electrical switch for powering one of said light source assemblies to provide a single point light source.

5. A front-lit hologram display item comprising:
   a hologram having a front surface and a rear surface, said hologram displaying a holographic image when said front surface is illuminated;
   a light source assembly structurally coupled to, and fixed relative to, said hologram at a location in front of said front surface to impinge light energy onto said front surface of said hologram;
   a housing; and
   light source assembly mounting means for receiving said light source assembly and for fixing said light source assembly relative to said housing at a plurality of selectable positions in said housing and in front of said front surface of said hologram, thereby positioning said light source assembly at a location to give optimum imaging of said hologram to an observer.

* * * * *